United States Patent
Huang et al.

(10) Patent No.: US 8,532,167 B2
(45) Date of Patent: Sep. 10, 2013

(54) SIGNAL PROCESSING DEVICE HAVING FEED FORWARD EQUALIZING UNITS WITH DIFFERENT TAP NUMBERS UTILIZED IN COMMUNICATION SYSTEM

(75) Inventors: Liang-Wei Huang, Taipei (TW);
Chih-Yung Shih, Taipei (TW);
Shieh-Hsing Kuo, Taipei County (TW)

(73) Assignee: Realtek Semiconductor Corp., Hsinchu (TW)

( * ) Notice: Subject to any disclaimer, the term of this patent is extended or adjusted under 35 U.S.C. 154(b) by 876 days.

(21) Appl. No.: 12/356,081

(22) Filed: Jan. 20, 2009

(65) Prior Publication Data
US 2009/0196336 A1   Aug. 6, 2009

(30) Foreign Application Priority Data
Jan. 31, 2008  (TW) .............................. 97103691 A

(51) Int. Cl.
*H04L 27/01* (2006.01)
(52) U.S. Cl.
USPC ........... 375/232; 375/229; 375/230; 375/233; 375/346; 375/240.04; 375/240.06; 333/18; 333/28 R

(58) Field of Classification Search
USPC .............. 375/346, 233, 240.04, 240.06, 229; 333/18, 28 R
See application file for complete search history.

(56) References Cited

U.S. PATENT DOCUMENTS

| | | | |
|---|---|---|---|
| 6,240,133 B1 * | 5/2001 | Sommer et al. | 375/232 |
| 6,912,208 B2 | 6/2005 | Zimmerman | |
| 7,489,749 B2 * | 2/2009 | Liu | 375/348 |
| 7,561,633 B2 * | 7/2009 | Parhi et al. | 375/267 |
| 7,715,473 B2 | 5/2010 | Kim | |
| 2005/0185742 A1 | 8/2005 | Liu | |
| 2007/0014378 A1 | 1/2007 | Parhi | |

FOREIGN PATENT DOCUMENTS

| | | |
|---|---|---|
| JP | 2003218963 | 7/2003 |
| JP | 200573260 | 3/2005 |
| TW | 200524269 | 7/2005 |
| TW | 200534579 | 10/2005 |
| WO | 2007041601 A2 | 4/2007 |

* cited by examiner

Primary Examiner — Shuwang Liu
Assistant Examiner — Ross Varndell
(74) Attorney, Agent, or Firm — McClure, Qualey & Rodack, LLP

(57) ABSTRACT

The present invention provides a signal processing device. The signal processing device includes a first feed forward equalizing unit, a first data slicing unit, a second feed forward equalizing unit, and a second data slicing unit. The first feed forward equalizing unit is utilized for performing a compensation operation according to a digital input signal so as to generate a first equalized signal. The first data slicing unit is coupled to the first feed forward equalizing unit, and utilized for generating a first output signal according to the first equalized signal. The second feed forward equalizing unit is coupled to the first data slicing unit, and utilized for generating a second equalized signal according to the first equalized signal. The second data slicing unit is coupled to the second feed forward equalizing unit, and utilized for generating a second output signal according to the second equalized signal.

21 Claims, 4 Drawing Sheets

SIGNAL PROCESSING DEVICE HAVING FEED FORWARD EQUALIZING UNITS WITH DIFFERENT TAP NUMBERS UTILIZED IN COMMUNICATION SYSTEM

BACKGROUND OF THE INVENTION

1. Field of the Invention

The present invention relates to a signal processing device, and more particularly, to a signal processing device utilized for reducing the timing recovery loop delay and increasing the signal noise to ratio (SNR) in a communication system.

2. Description of the Prior Art

In general, in a wire transmitting communication system (such as a 10G Base-T system, a Giga Ethernet system, or a 10/100 Ethernet system), since signals decay when passing through channels in the wire transmitting communication system, a feed forward equalizer (FFE) or a decision feedback equalizer (DFE) comprising an FFE and a feedback equalizer (FBE) is required to eliminate the channel effect.

SUMMARY OF THE INVENTION

It is therefore one of the objectives of the present invention to provide a signal processing device utilized for reducing the timing recovery loop delay and increasing the signal-to-noise ratio (SNR) in a communication system.

In accordance with an embodiment of the present invention, a signal processing device utilized in a communication system is disclosed, wherein the communication system comprises at least a channel. The signal processing device comprises a first feed forward equalizing unit, a first data slicing unit, a second feed forward equalizing unit, and a second data slicing unit. The first feed forward equalizing unit is utilized for performing a compensation operation according to a digital input signal so as to generate a first equalized signal. The first data slicing unit is coupled to the first feed forward equalizing unit, and utilized for generating a first output signal according to the first equalized signal. The second feed forward equalizing unit is coupled to the first data slicing unit, and utilized for generating a second equalized signal according to the first equalized signal. The second data slicing unit is coupled to the second feed forward equalizing unit, and utilized for generating a second output signal according to the second equalized signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and the claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

The present invention relates to a signal processing device which can be implemented in a communication system, and this document will describe several exemplary embodiments that apply the signal processing device of the present invention. However, a person of average skill in the pertinent art should understand that the signal processing device of the present invention can be applied to other similar types of communication systems and is not limited to the particular embodiments described in the following paragraphs or to the particular circuit schemes in which any features of such embodiments are implemented.

In general, the signal processing device of the present invention can be applied to all kinds of communication systems. A signal processing device applied to a 10G Base-T system, a Giga Ethernet system, or a 10/100 Ethernet system is disclosed in this document. However, this is only for illustrative purposes and is not meant to be a limitation of the present invention. In addition, under conditions of not affecting the technical disclosure of the present invention, the communication system comprising the 10G Base-T system, the Giga Ethernet system, or the 10/100 Ethernet system will be used in this document as an example to illustrate the detailed scheme and the operation principles of the signal processing device in accordance with the present invention.

Figure 1:
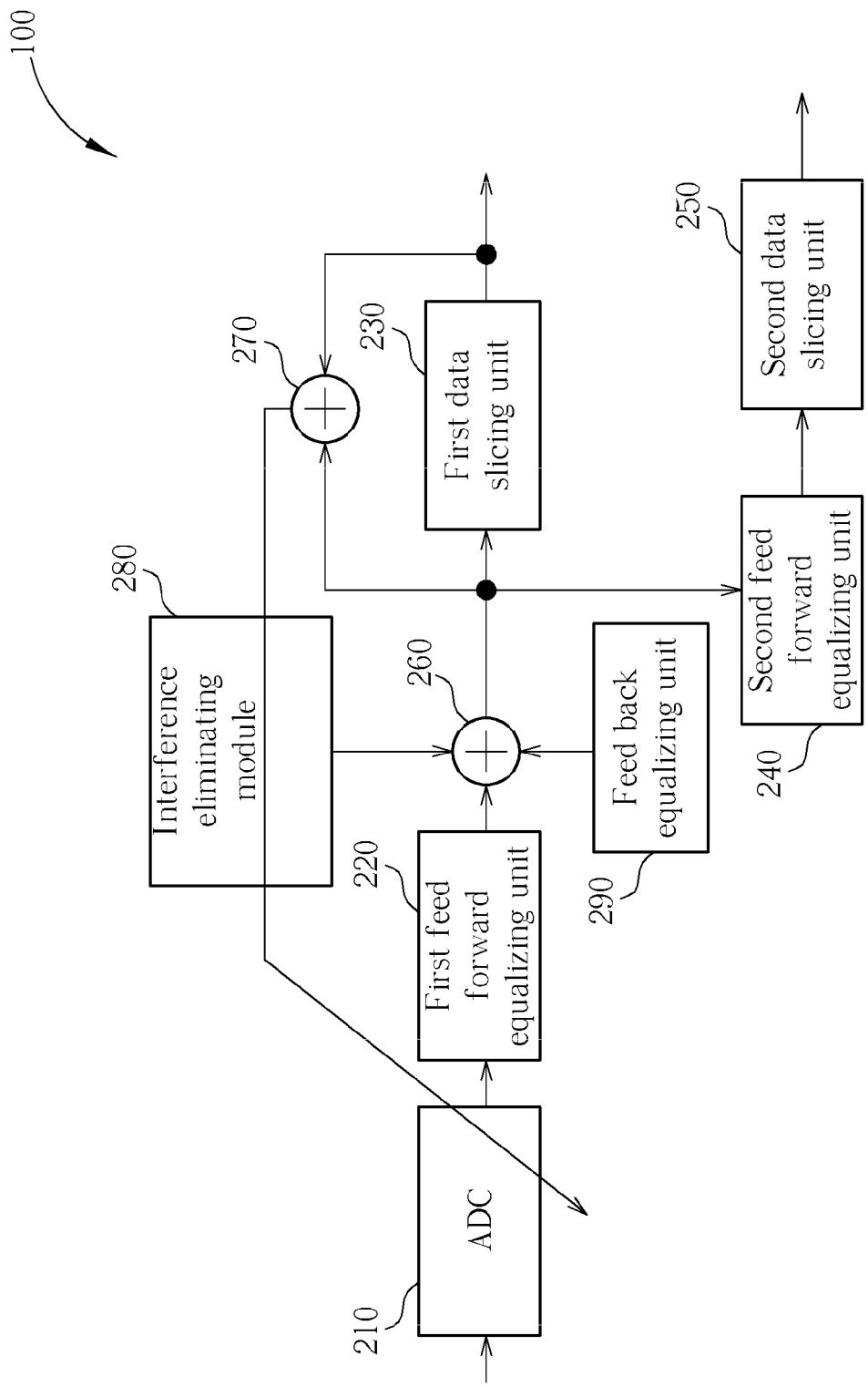
FIG. 1 shows a simplified block diagram of a signal processing device in accordance with a first embodiment of the present invention.

Please refer to FIG. 1. FIG. 1 shows a simplified block diagram of a signal processing device 100 in accordance with a first embodiment of the present invention, wherein the signal processing device 100 is utilized in a communication system (not shown), and the communication system comprises a plurality of channels (not shown). As shown in FIG. 1, the signal processing device 100 comprises an analog-to-digital converter (ADC) 210, a first feed forward equalizing unit 220, a first data slicing unit 230, a second feed forward equalizing unit 240, a second data slicing unit 250, a first adding unit 260, a second adding unit 270, an interference eliminating module 280, and a feedback equalizing unit 290, wherein a tap number of the first feed forward equalizing unit 220 is smaller than a tap number of the second feed forward equalizing unit 240. In addition, the ADC 210 is coupled to one of the plurality of channels (not shown), and utilized for performing an analog-to-digital converting operation on an analog input signal (not shown) of the channel to generate a digital input signal (not shown), and the first feed forward equalizing unit 220 is utilized for performing a preliminary compensation operation according to the digital input signal corresponding to the channel so as to generate a first equalized signal (not shown) and output the first equalized signal to the first adding unit 260. The first adding unit 260 is coupled to the first feed forward equalizing unit 220, the first data slicing unit 230, the interference eliminating module 280, and the feedback equalizing unit 290, and utilized for generating a third output signal (not shown) to the first data slicing unit 230, the second adding unit 270, and the second feed forward equalizing unit 240 according to the first equalized signal, an interference eliminating signal (not shown) outputted by the interference eliminating module 280, and a feedback equalized signal (not shown) outputted by the feedback equalizing unit 290. In addition, the first data slicing unit 230 is utilized for generating a first output signal (not shown) according to the third output signal. The second adding unit 270 is coupled to the first adding unit 260 and the first data slicing unit 230, and utilized for generating a fourth output signal (not shown) to the interference eliminating module 280 according to the third output signal and the first output signal. The interference eliminating module 280 is coupled to the first adding unit 260 and the second adding unit 270, and utilized for generating the interference eliminating signal to the first adding unit 260 according to the fourth output signal. Please note that the interference eliminating module 280 comprises an echo canceller (not shown) and a plurality of near end crosstalk (NEXT) cancellers (not shown), wherein the echo canceller is utilized for eliminating interference of the channel, and the plurality of near end crosstalk (NEXT) cancellers are utilized for eliminating interference from the other channels of the plurality of channels. In addition, the second feed forward equalizing unit 240 is utilized for performing a fine compensation operation according to the third output signal so as to generate a second equalized signal (not shown). The second data slicing unit 250 is coupled to the second feed forward equalizing unit 240, and utilized for generating a second output signal (not shown) according to the second equalized signal. In addition, please note that the above embodiment is only for an illustrative purpose and is not meant to be a limitation of the present invention. For example, the feedback equalizing unit 290 is not an essential element of the signal processing device 100 in the present invention, and thus the feedback equalizing unit 290 can be selectively omitted under a specific condition.

Figure 2:
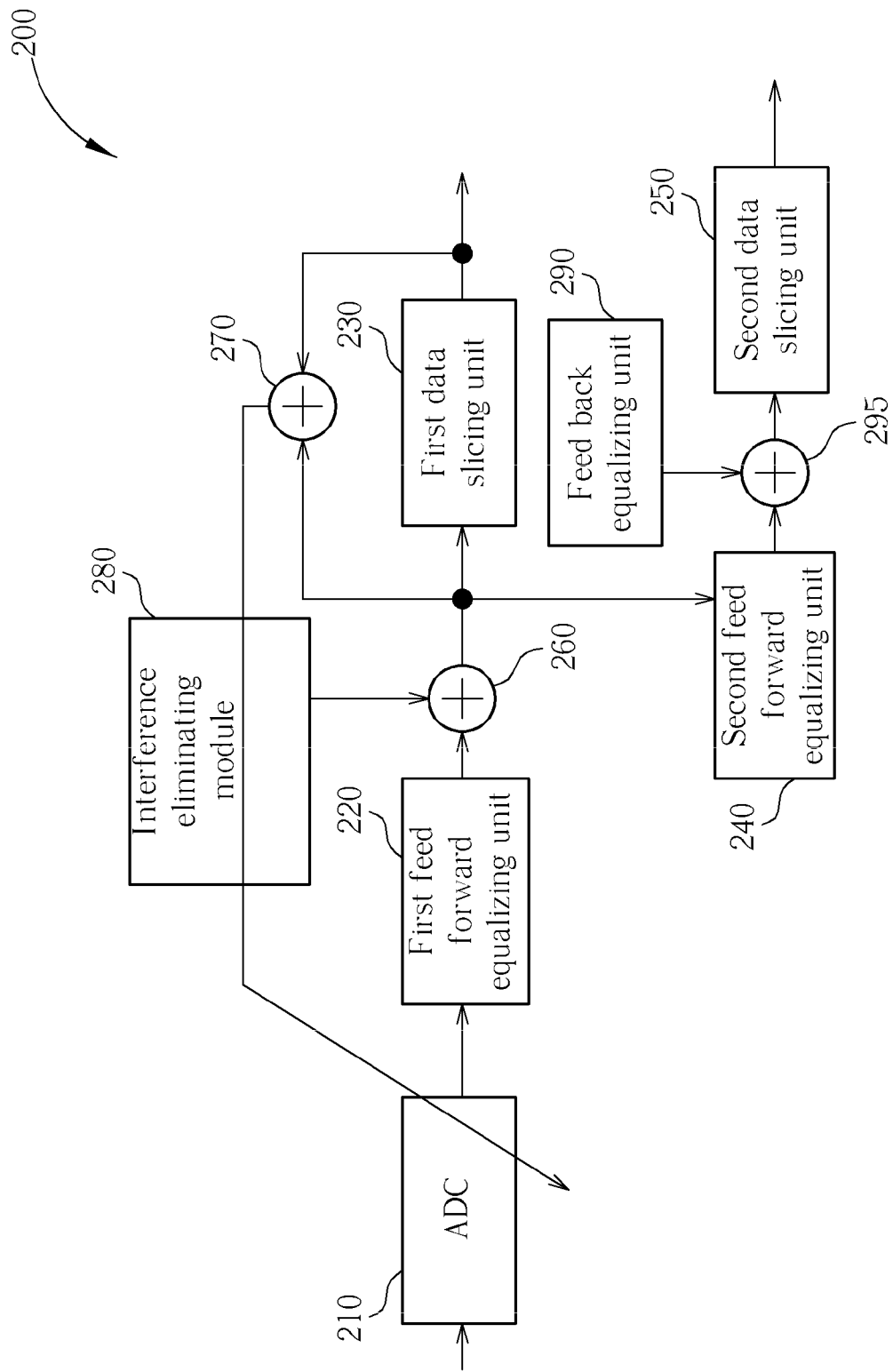
FIG. 2 shows a simplified block diagram of a signal processing device in accordance with a second embodiment of the present invention.

Please refer to FIG. 2. FIG. 2 shows a simplified block diagram of a signal processing device 200 in accordance with a second embodiment of the present invention, wherein the signal processing device 200 is also utilized in a communication system (not shown), and the communication system comprises a plurality of channels (not shown). The signal processing device 200 in the second embodiment of the present invention has similar scheme as that of the signal processing device 100 in the first embodiment of the present invention, and thus a part of the element symbols of the signal processing device 200 in FIG. 2 are the same as the element symbols of the signal processing device 100 shown in FIG. 1. Similar with the signal processing device 100 in the first embodiment of the present invention, the signal processing device 200 in the second embodiment of the present invention also comprises an ADC 210, a first feed forward equalizing unit 220, a first data slicing unit 230, a second feed forward equalizing unit 240, a second data slicing unit 250, a first adding unit 260, a second adding unit 270, an interference eliminating module 280, and a feedback equalizing unit 290. In addition, the signal processing device 200 further comprises a third adding unit 295, wherein a tap number of the first feed forward equalizing unit 220 is also smaller than a tap number of the second feed forward equalizing unit 240. The ADC 210 is coupled to one of the plurality of channels (not shown), and utilized for performing an analog-to-digital converting operation on an analog input signal (not shown) of the channel to generate the digital input signal (not shown), and the first feed forward equalizing unit 220 is utilized for performing a preliminary compensation operation according to the digital input signal corresponding to the channel so as to generate a first equalized signal (not shown) and output the first equalized signal to the first adding unit 260. The first adding unit 260 is coupled to the first feed forward equalizing unit 220, the first data slicing unit 230, and the interference eliminating module 280, and utilized for generating a third output signal (not shown) to the first data slicing unit 230, the second adding unit 270, and the second feed forward equalizing unit 240 according to the first equalized signal and an interference eliminating signal (not shown) outputted by the interference eliminating module 280. In addition, the first data slicing unit 230 is utilized for generating a first output signal (not shown) according to the third output signal. The second adding unit 270 is coupled to the first adding unit 260 and the first data slicing unit 230, and utilized for generating a fourth output signal (not shown) to the interference eliminating module 280 according to the third output signal and the first output signal. The interference eliminating module 280 is coupled to the first adding unit 260 and the second adding unit 270, and utilized for generating the interference eliminating signal to the first adding unit 260 according to the fourth output signal. Please note that the interference eliminating module 280 comprises an echo canceller (not shown) and a plurality of near end crosstalk (NEXT) cancellers (not shown), wherein the echo canceller is utilized for eliminating interference of the channel, and the plurality of near end crosstalk (NEXT) cancellers are utilized for eliminating interference from the other channels of the plurality of channels. In addition, the second feed forward equalizing unit 240 is utilized for performing a fine compensation operation according to the third output signal so as to generate a second equalized signal (not shown). The third adding unit 295 is coupled between the second feed forward equalizing unit 240, the feedback equalizing unit 290, and the second data slicing unit 250, wherein the third adding unit 295 generates a fifth output signal (not shown) according to the second equalized signal and a feedback equalized signal generated by the feedback equalizing unit 290, and the second data slicing unit 250 generates a second output signal (not shown) according to the fifth output signal. In addition, please note that the above embodiment is only for an illustrative purpose and is not meant to be a limitation of the present invention. For example, the feedback equalizing unit 290 and the third adding unit 295 are not essential elements of the signal processing device 200 in the present invention, and thus the feedback equalizing unit 290 and the third adding unit 295 can be selectively omitted under a specific condition.

Figure 3:
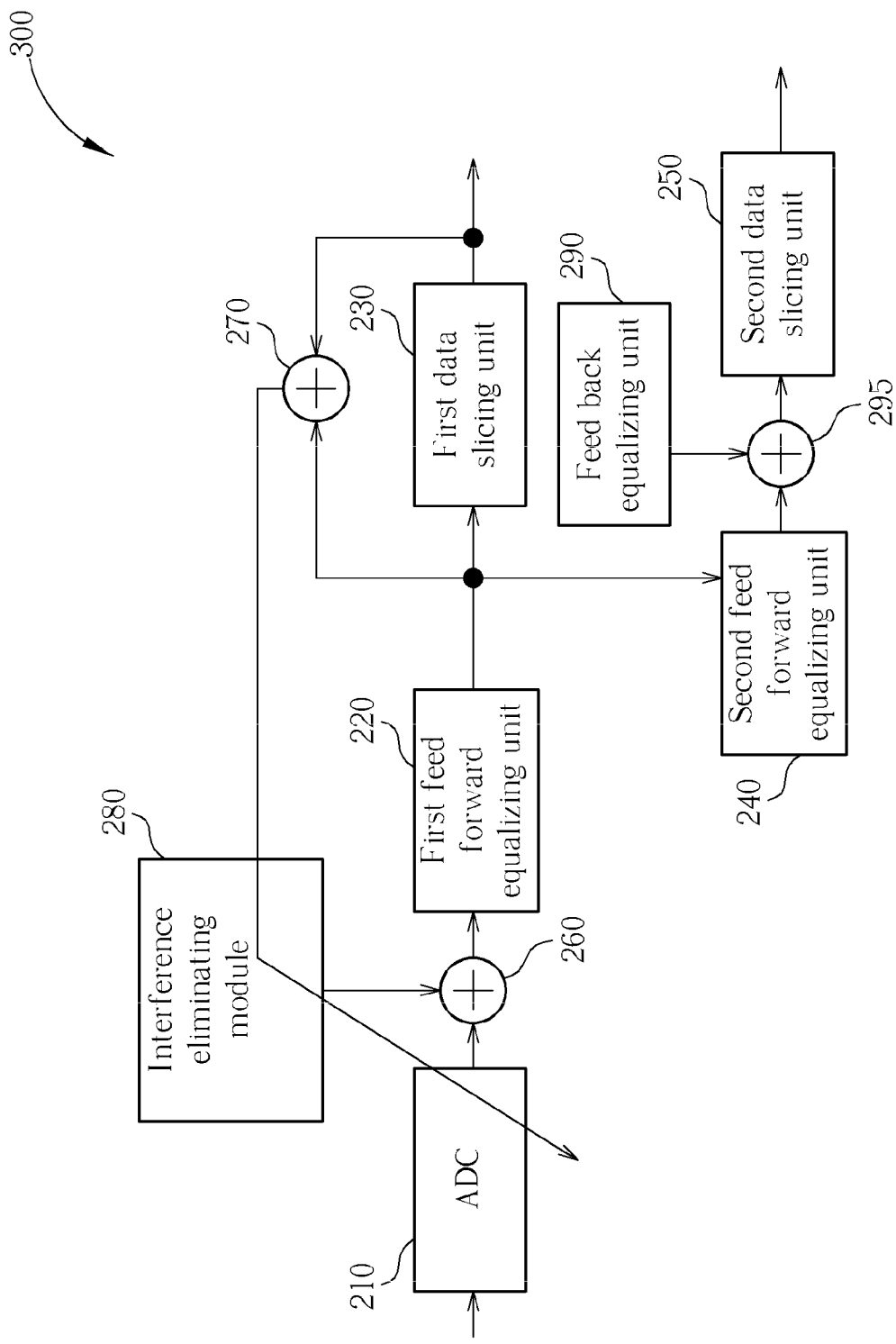
FIG. 3 shows a simplified block diagram of a signal processing device in accordance with a third embodiment of the present invention.

Please refer to FIG. 3. FIG. 3 shows a simplified block diagram of a signal processing device 300 in accordance with a third embodiment of the present invention, wherein the signal processing device 300 is also utilized in a communication system (not shown), and the communication system comprises a plurality of channels (not shown). The signal processing device 300 in the third embodiment of the present invention has similar scheme as that of the signal processing device 200 in the second embodiment of the present invention, and thus a part of the element symbols of the signal processing device 300 in FIG. 3 are the same as the element symbols of the signal processing device 200 shown in FIG. 2. Similar with the signal processing device 200 in the second embodiment of the present invention, the signal processing device 300 in the third embodiment of the present invention also comprises an ADC 210, a first feed forward equalizing unit 220, a first data slicing unit 230, a second feed forward equalizing unit 240, a second data slicing unit 250, a first adding unit 260, a second adding unit 270, an interference eliminating module 280, a feedback equalizing unit 290, and a third adding unit 295, wherein a tap number of the first feed forward equalizing unit 220 is also smaller than a tap number of the second feed forward equalizing unit 240. The ADC 210 is coupled to one of the plurality of channels (not shown), and utilized for performing an analog-to-digital converting operation on an analog input signal (not shown) of the channel to generate the digital input signal (not shown). The first adding unit 260 is coupled to the first feed forward equalizing unit 220, the interference eliminating module 280, and the ADC 210, and utilized for generating a third output signal (not shown) to the first feed forward equalizing unit 220 according to an interference eliminating signal (not shown) and the digital input signal. The first feed forward equalizing unit 220 is utilized for performing a preliminary compensation operation according to the third output signal so as to generate a first equalized signal (not shown) and output the first equalized signal to the first data slicing unit 230, the second adding unit 270, and the second feed forward equalizing unit 240. The first data slicing unit 230 is coupled to the first feed forward equalizing unit 220, and utilized for generating a first output signal (not shown) according to the first equalized signal. The second adding unit 270 is coupled to the first feed forward equalizing unit 220 and the first data slicing unit 230, and utilized for generating a fourth output signal (not shown) to the interference eliminating module 280 according to the first equalized signal and the first output signal. The interference eliminating module 280 is coupled to the first adding unit 260 and the second adding unit 270, and utilized for generating the interference eliminating signal to the first adding unit 260 according to the fourth output signal. Please note that the interference eliminating module 280 comprises an echo canceller (not shown) and a plurality of near end crosstalk (NEXT) cancellers (not shown), wherein the echo canceller is utilized for eliminating interference of the channel, and the plurality of near end crosstalk (NEXT) cancellers are utilized for eliminating interference from the other channels of the plurality of channels. In addition, the second feed forward equalizing unit 240 is utilized for performing a fine compensation operation according to the first equalized signal so as to generate a second equalized signal (not shown). The third adding unit 295 is coupled to the second feed forward equalizing unit 240, the feedback equalizing unit 290, and the second data slicing unit 250, wherein the third adding unit 295 generates a fifth output signal (not shown) according to the second equalized signal and a feedback equalized signal generated by the feedback equalizing unit 290, and the second data slicing unit 250 generates a second output signal (not shown) according to the fifth output signal. In addition, please note that the above embodiment is only for an illustrative purpose and is not meant to be a limitation of the present invention. For example, the feedback equalizing unit 290 and the third adding unit 295 are not essential elements of the signal processing device 200 in the present invention, and thus the feedback equalizing unit 290 and the third adding unit 295 can be selectively omitted under a specific condition.

Figure 4:
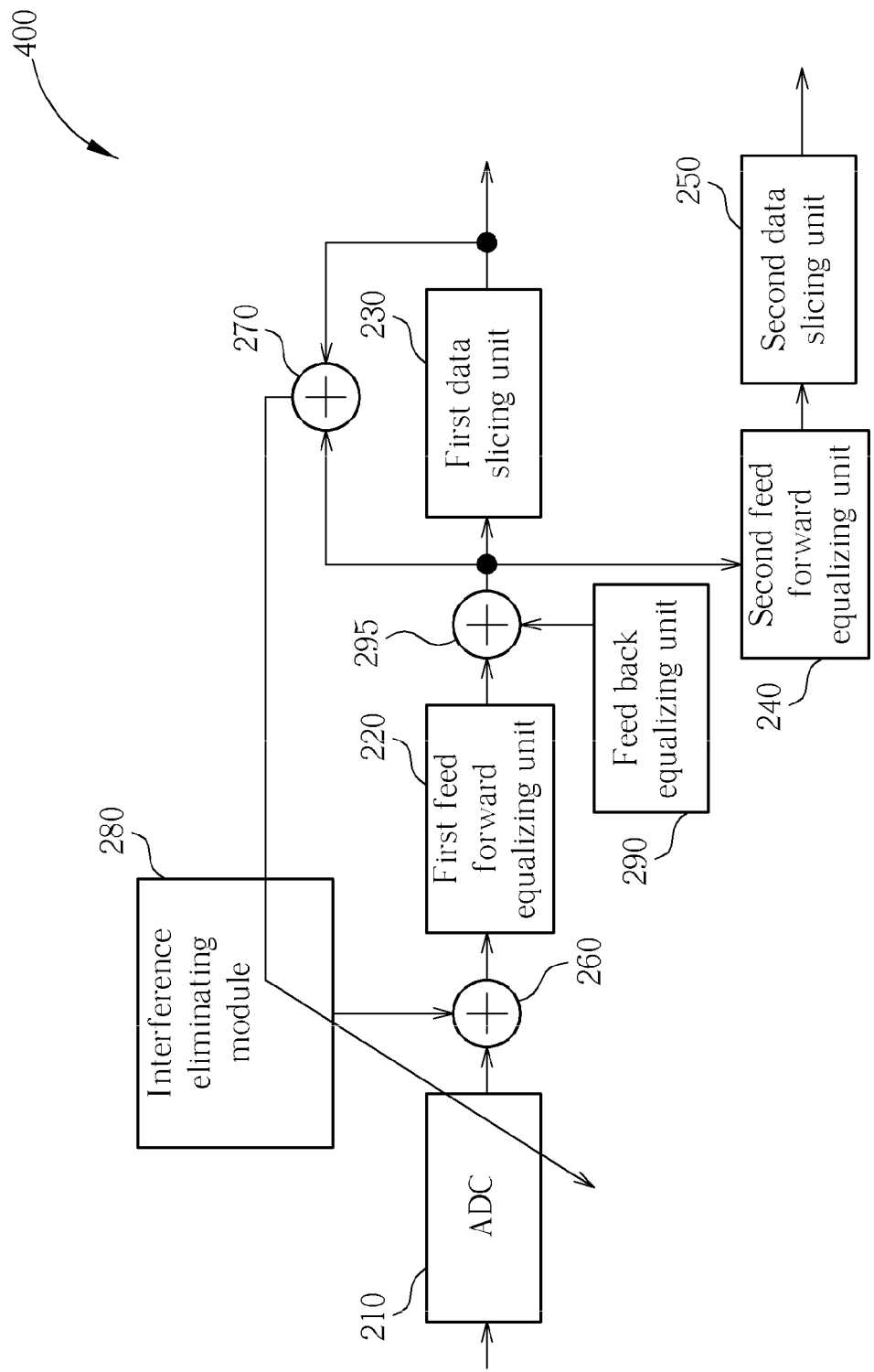
FIG. 4 shows a simplified block diagram of a signal processing device in accordance with a fourth embodiment of the present invention.

Please refer to FIG. 4. FIG. 4 shows a simplified block diagram of a signal processing device 400 in accordance with a fourth embodiment of the present invention, wherein the signal processing device 400 is also utilized in a communication system (not shown), and the communication system comprises a plurality of channels (not shown). The signal processing device 400 in the fourth embodiment of the present invention has similar scheme as that of the signal processing device 200 in the third embodiment of the present invention, and thus a part of the element symbols of the signal processing device 400 in FIG. 4 are the same as the element symbols of the signal processing device 300 shown in FIG. 3. Similar with the signal processing device 300 in the third embodiment of the present invention, the signal processing device 400 in the fourth embodiment of the present invention also comprises an ADC 210, a first feed forward equalizing unit 220, a first data slicing unit 230, a second feed forward equalizing unit 240, a second data slicing unit 250, a first adding unit 260, a second adding unit 270, an interference eliminating module 280, a feedback equalizing unit 290, and a third adding unit 295, wherein a tap number of the first feed forward equalizing unit 220 is also smaller than a tap number of the second feed forward equalizing unit 240. The ADC 210 is coupled to one of the plurality of channels (not shown), and utilized for performing an analog-to-digital converting operation on an analog input signal (not shown) of the channel to generate the digital input signal (not shown). The first adding unit 260 is coupled to the first feed forward equalizing unit 220, the interference eliminating module 280, and the ADC 210, and utilized for generating a third output signal (not shown) to the first feed forward equalizing unit 220 according to an interference eliminating signal (not shown) and the digital input signal. The first feed forward equalizing unit 220 is utilized for performing a preliminary compensation operation according to the third output signal so as to generate a first equalized signal (not shown) and output the first equalized signal to the third adding unit 295. The third adding unit 295 is coupled to the first feed forward equalizing unit 220, the feedback equalizing unit 290, the second adding unit 270, the second feed forward equalizing unit 240, and the first data slicing unit 230, and utilized for generating a fifth output signal (not shown) to the second adding unit 270, the second feed forward equalizing unit 240, and the first data slicing unit 230 according to the first equalized signal and a feedback equalized signal generated by the feedback equalizing unit 290. The first data slicing unit 230 is utilized for generating a first output signal (not shown) the to second adding unit 270 according to the fifth output signal, and the second adding unit 270 is utilized for generating a fourth output signal (not shown) to the interference eliminating module 280 according to the fifth output signal and the first output signal. The interference eliminating module 280 is coupled to the first adding unit 260 and the second adding unit 270, and utilized for generating the interference eliminating signal to the first adding unit 260 according to the fourth output signal. Please note that the interference eliminating module 280 comprises an echo canceller (not shown) and a plurality of near end crosstalk (NEXT) cancellers (not shown), wherein the echo canceller is utilized for eliminating interference of the channel, and the plurality of near end crosstalk (NEXT) cancellers are utilized for eliminating interference from the other channels of the plurality of channels. In addition, the second feed forward equalizing unit 240 is utilized for performing a fine compensation operation according to the fifth output signal so as to generate a second equalized signal (not shown) to the second data slicing unit 250. The second data slicing unit 250 is coupled to the second feed forward equalizing unit 240 and utilized for generating a second output signal (not shown) according to the second equalized signal. In addition, please note that the above embodiment is only for an illustrative purpose and is not meant to be a limitation of the present invention. For example, the feedback equalizing unit 290 is not an essential element of the signal processing device 200 in the present invention, and thus the feedback equalizing unit 290 can be selectively omitted under a specific condition.

Briefly summarized, the signal processing device disclosed by the present invention comprises a shorter first feed forward equalizing unit and a longer second feed forward equalizing unit (i.e., a tap number of the first feed forward equalizing unit is smaller than a tap number of the second feed forward equalizing unit) to make up a scheme having a shorter timing recovery loop, and thus the signal processing device of the present invention is capable of reducing the timing recovery loop delay and increasing the signal-to-noise ratio (SNR) in a communication system.

Those skilled in the art will readily observe that numerous modifications and alterations of the device and method may be made while retaining the teachings of the invention.

What is claimed is:

1. A signal processing device utilized in a communication system, the communication system comprising at least a channel, the signal processing device comprising:
   a first feed forward equalizing unit, for performing a compensation operation according to a digital input signal so as to generate a first equalized signal;
   a first data slicing unit, coupled to the first feed forward equalizing unit, for generating a first output signal according to the first equalized signal;
   a first adding unit, coupled between the first feed forward equalizing unit and the first data slicing unit for generating a third output signal to the first data slicing unit and the second feed forward equalizing unit according to the first equalized signal and an interference eliminating signal;
   a second feed forward equalizing unit, coupled to the output of the first adding unit, for generating a second equalized signal according to the first equalized signal; and
   a second data slicing unit, coupled to the second feed forward equalizing unit, for generating a second output signal according to the second equalized signal;
   wherein a tap number of the first feed forward equalizing unit is smaller than a tap number of the second feed forward equalizing unit.

2. The signal processing device of claim 1, further comprising:
   a second adding unit, coupled between the first adding unit and the first data slicing unit, for generating a fourth output signal according to the third output signal and the first output signal; and
   an interference eliminating module, coupled between the first adding unit and the second adding unit, for generating the interference eliminating signal to the first adding unit according to the fourth output signal.

3. The signal processing device of claim 2, further comprising:
   a feedback equalizing unit, coupled to the first adding unit;
   wherein the first adding unit generates the third output signal according to the first equalized signal, the interference eliminating signal, and a feedback equalized signal of the feedback equalizing unit.

4. The signal processing device of claim 2, further comprising:
   a third adding unit, coupled between the second feed forward equalizing unit and the second data slicing unit; and
   a feedback equalizing unit, coupled to the third adding unit;
   wherein the third adding unit generates a fifth output signal according to the second equalized signal and a feedback equalized signal generated by the feedback equalizing unit, and the second data slicing unit generates the second output signal according to the fifth output signal.

5. The signal processing device of claim 2, wherein the communication system comprises a plurality of channels, and the interference eliminating module comprises:
   an echo canceller, for eliminating interference of the channel; and
   at least a near end crosstalk (NEXT) canceller, for eliminating interference from the other channels.

6. The signal processing device of claim 1,
   further comprising: an analog-to-digital converter (ADC), coupled to the channel, for performing an analog-to-digital converting operation on an analog input signal of the channel to generate the digital input signal; wherein,
   the first adding unit is coupled between the first feed forward equalizing unit and the ADC, for generating the third output signal to the first feed forward equalizing unit according to an interference eliminating signal and the digital input signal;
   a second adding unit, coupled between the first adding unit and the first data slicing unit, for generating a fourth output signal according to the first equalized signal and the first output signal; and
   an interference eliminating module, coupled between the first adding unit and the second adding unit, for generating the interference eliminating signal to 10 the first adding unit according to the fourth output signal.

7. The signal processing device of claim 6, further comprising:
   a third adding unit, coupled between the second feed forward equalizing unit and the second data slicing unit; and
   a feedback equalizing unit, coupled to the third adding unit;
   wherein the third adding unit generates a fifth output signal according to the second equalized signal and a feedback equalized signal generated by the feedback equalizing unit, and the second data slicing unit generates the second output signal according to the fifth output signal.

8. The signal processing device of claim 6, further comprising:
   a third adding unit, coupled between the first feed forward equalizing unit and the first data slicing unit; and
   a feedback equalizing unit, coupled to the third adding unit;
   wherein the third adding unit generates a fifth output signal according to the first equalized signal and a feedback equalized signal generated by the feedback equalizing unit, and the second data slicing unit performs a compensation operation according to the fifth output signal to generate the second equalized signal, and the second adding unit generates the fourth output signal according to the fifth output signal and the first output signal.

9. The signal processing device of claim 6, wherein the communication system comprises a plurality of channels, and the interference eliminating module comprises:
   an echo canceller, for eliminating interference of the channel; and
   at least a near end crosstalk (NEXT) canceller, for eliminating interference from the other channels.

10. The signal processing device of claim 6, wherein the communication system comprises a 10G Base-T system, a Giga Ethernet system, or a 10/100 Ethernet system.

11. A signal processing method utilized in a communication system, the communication system comprising at least a channel, the signal processing method comprising:
    utilizing a first feed forward equalizing unit for performing a compensation operation according to a digital input signal so as to generate a first equalized signal;
    utilizing a first data slicing unit for generating a first output signal according to the first equalized signal;
    utilizing a second feed forward equalizing unit for generating a second equalized signal according to the first equalized signal, wherein a tap number of the first feed forward equalizing unit is smaller than a tap number of the second feed forward equalizing unit;
    utilizing a first adding unit for generating a third output signal to the first data slicing unit and the second feed forward equalizing unit according to the first equalized signal and an interference eliminating signal; and utilizing a second data slicing unit for generating a second output signal according to the second equalized signal.

12. The signal processing method of claim 11, further comprising:
utilizing a second adding unit for generating a fourth output signal according to the third output signal and the first output signal; and
utilizing an interference eliminating module for generating the interference eliminating signal to the first adding unit according to the fourth output signal.

13. The signal processing method of claim 12, further comprising:
coupling a feedback equalizing unit to the first adding unit; and
utilizing the first adding unit to generate the third output signal according to the first equalized signal, the interference eliminating signal, and a feedback equalized signal of the feedback equalizing unit.

14. The signal processing method of claim 12, further comprising:
coupling a third adding unit between the second feed forward equalizing unit and the second data slicing unit;
coupling a feedback equalizing unit to the third adding unit; and
utilizing the third adding unit to generate a fifth output signal according to the second equalized signal and a feedback equalized signal generated by the feedback equalizing unit, and the second data slicing unit generates the second output signal according to the fifth output signal.

15. The signal processing method of claim 12, wherein the communication system comprises a plurality of channels, and the interference eliminating module comprises:
an echo canceller, for eliminating interference of the channel; and
at least a near end crosstalk (NEXT) canceller, for eliminating interference from the other channels.

16. The signal processing method of claim 11, further comprising:
utilizing an analog-to-digital converter (ADC) for performing an analog-to-digital converting operation on an analog input signal of the channel to generate the digital input signal;
utilizing the first adding unit to generate the third output signal to the first feed forward equalizing unit according to an interference eliminating signal and the digital input signal;
utilizing a second adding unit for generating a fourth output signal according to the first equalized signal and the first output signal; and
utilizing an interference eliminating module for generating the interference eliminating signal to the first adding unit according to the fourth output signal.

17. The signal processing method of claim 16, further comprising:

coupling a third adding unit between the second feed forward equalizing unit and the second data slicing unit;
coupling a feedback equalizing unit to the third adding unit; and
utilizing the third adding unit to generate a fifth output signal according to the second equalized signal and a feedback equalized signal generated by the feedback equalizing unit, and the second data slicing unit generates the second output signal according to the fifth output signal.

18. The signal processing method of claim 16, further comprising:
coupling a third adding unit between the first feed forward equalizing unit and the first data slicing unit; and
coupling a feedback equalizing unit to the third adding unit;
utilizing the third adding unit to generate a fifth output signal according to the first equalized signal and a feedback equalized signal generated by the feedback equalizing unit, and the second data slicing unit performs a compensation operation according to the fifth output signal to generate the second equalized signal, and the second adding unit generates the fourth output signal according to the fifth output signal and the first output signal.

19. The signal processing method of claim 16, wherein the communication system comprises a plurality of channels, and the interference eliminating module comprises:
an echo canceller, for eliminating interference of the channel; and
at least a near end crosstalk (NEXT) canceller, for eliminating interference from the other channels.

20. The signal processing method of claim 16, wherein the communication system comprises a 10G Base-T system, a Giga Ethernet system, or a 10/100 Ethernet system.

21. A signal processing device utilized in a communication system, the communication system comprising at least a channel, the signal processing device comprising:
a first feed forward equalizing unit configured to generate a first equalized signal;
a first data slicing unit, coupled to the first feed forward equalizing unit, configured to generate a first output signal according to the first equalized signal;
a first adding unit, coupled between the first feed forward equalizing unit and the first data slicing unit, configured to receive the first equalized signal and an interference eliminating signal and generate a third output signal;
a second feed forward equalizing unit, coupled to the first data slicing unit output of the first adding unit, configured to generate a second equalized signal, wherein the third output signal is received by the first data slicing unit and the second feed forward equalizing unit; and
a second data slicing unit, coupled to the second feed forward equalizing unit, configured to generate a second output signal according to the second equalized signal.

* * * * *